United States Patent
Stokes, III et al.

(10) Patent No.: US 7,155,018 B1
(45) Date of Patent: Dec. 26, 2006

(54) SYSTEM AND METHOD FACILITATING ACOUSTIC ECHO CANCELLATION CONVERGENCE DETECTION

(75) Inventors: Jack Wilson Stokes, III, North Bend, WA (US); Henrique S. Malvar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 836 days.

(21) Appl. No.: 10/123,684

(22) Filed: Apr. 16, 2002

(51) Int. Cl.
- *H04B 3/20* (2006.01)
- *A61F 11/06* (2006.01)
- *G10K 11/16* (2006.01)
- *H03B 29/00* (2006.01)
- *H04M 9/08* (2006.01)

(52) U.S. Cl. .............. 381/66; 381/71.11; 381/71.14; 370/286; 370/289; 370/290; 379/406.01; 379/406.08; 379/406.12

(58) Field of Classification Search ............. 381/66, 381/71.14, 71.11; 370/289, 286, 290; 708/322; 379/406.1–16
See application file for complete search history.

(56) References Cited

U.S. PATENT DOCUMENTS

| | | | |
|---|---|---|---|
| 5,828,756 A | 10/1998 | Benesty et al. | |
| 6,963,649 B1 * | 11/2005 | Vaudrey et al. | 381/94.7 |
| 2002/0160733 A1 * | 10/2002 | Kajita | 455/234.1 |

OTHER PUBLICATIONS

V. Fischer, et al. "*A Software Stereo Acoustic Echo Canceler For Microsoft Windows*", p. 1-14.

* cited by examiner

*Primary Examiner*—Vivian Chin
*Assistant Examiner*—Douglas Suthers
(74) *Attorney, Agent, or Firm*—Amin, Turocy & Calvin, LLP

(57) ABSTRACT

A system and method facilitating acoustic echo cancellation convergence detection is provided. The invention includes an acoustic echo cancellation convergence detector having a center clipping component, a convergence calculator, a convergence filter and a convergence statistic component. The invention provides for the acoustic echo cancellation convergence detector to provide an output regarding convergence of an adaptive filter based, at least in part, upon a filtered convergence statistic. Optionally, the acoustic echo cancellation convergence detector can provide an output associated with convergence history.

19 Claims, 11 Drawing Sheets

SYSTEM AND METHOD FACILITATING ACOUSTIC ECHO CANCELLATION CONVERGENCE DETECTION

TECHNICAL FIELD

The present invention relates generally to acoustic echo cancellation, and more particularly to a system and method facilitating acoustic echo cancellation convergence detection.

BACKGROUND OF THE INVENTION

Acoustic echo is a common problem with full duplex audio system(s), for example, audio conferencing systems and/or speech recognition systems. Acoustic echo originates in a local audio loop back that occurs when an input device, such as a microphone, picks up audio signals from an audio output device, for example, a speaker, and sends it back to an originating participant. The originating participant hears this acoustic echo of the originating participant's own voice as the other participant speaks.

For example, consider the instance in which a first participant at a first physical location with a microphone and speaker and a second participant at a second physical location with a microphone and speaker are taking part in a call or conference. When the first participant speaks into the microphone at the first physical location, the second participant hears the first participant's voice played on speaker(s) at the second physical location. However, the microphone at the second physical location can pick up and transmit the first participant's voice. The first participant can then hear an echo of the first participant's voice with a slight delay due to the round-trip transmission time.

Acoustic echo can be caused or exacerbated when sensitive microphone(s) are used, microphone and/or speaker analog volume is turned up high, and/or the microphone and speaker are physically in close proximity to one another. In addition to being annoying, acoustic echo can prevent normal conversation among participants in a conference, or prevent normal operation of an automatic speech recognition system.

Conventionally, acoustic echo was reduced using audio headset(s) that prevent an audio input device (e.g., microphone) from picking up the audio output signal. Additionally, special microphones with echo suppression features were utilized. However, these microphones are typically expensive as they contain digital signal processing electronics that scan the incoming audio signal and detect and cancel acoustic echo. Acoustic echo can also be reduced by acoustic echo cancellation component(s); however, with the wide variation of audio input device and audio output devices, effective acoustic echo cancellation can be difficult and result in a frustrating experience for end user(s).

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for an acoustic echo cancellation (AEC) convergence detector, the output of which can be employed, for example, to alert further processing modules or software application(s) when an AEC algorithm has failed to converge and/or lost convergence after previously having converged. The AEC algorithm can use an adaptive filter to model the impulse response of a room. The echo is either removed (cancelled) or reduced, for example, by a differential component, once the adaptive filter converges (e.g., its impulse response approximates closely enough the impulse response of the room). Failed or lost convergence of the adaptive filter may result in the perception of echo or audible distortion by the end user. Thus, the AEC convergence detector of the present invention allows application(s) to monitor the quality of the output of the AEC algorithm and provide this information to the end user in order to improve the quality of the audio experience. As such, the application(s) can alert the end user of the problem and offer suggestion(s) to minimize the problem (e.g., modifying the physical placement of microphone and loudspeaker).

The AEC convergence detector includes a center clipping component, a convergence calculator, a convergence filter and a convergence statistic component. The center clipping component can monitor the output of a differential component in the frequency domain and compare the output to a background noise level for each frequency band of interest. The center clipping component provides an output as to whether the frequency bin(s) are center clipped. The output of the differential component can be based on a difference of an output of an adaptive filter and an output of an audio input device (e.g., microphone and/or speaker phone).

The convergence calculator calculates a convergence parameter for a current frame of input data. The convergence parameter can be calculated by summing the number of center clipped frequency bins and dividing the result by the total number of frequency bins.

The convergence filter filters the convergence parameter and outputs a filtered convergence parameter. The filtered convergence parameter can be calculated by averaging the convergence parameters over past frame(s) of captured input data. Filtering is used to smooth the convergence parameter for each input frame. A boxcar filter can be employed. A boxcar filter sums the current sample with the previous N−1 samples and divides the result by N, N being an integer greater to or equal to one. However, any suitable low pass filter can be used in accordance with the present invention.

The convergence statistic component calculates a convergence statistic for the current frame. The convergence statistic can be based upon the filtered convergence parameter and/or the convergence statistic for a previous frame of input data multiplied by a decay coefficient (e.g., in the range of 0 to 1.0, inclusive). The decayed coefficient can be used to reduce detection of divergence for a small number of frame(s). The decay coefficient can be selected, for example, to prevent the AEC convergence detector from immediately identifying instantaneous divergence. For example, the convergence statistic can be the greater of the filtered convergence parameter and the convergence statistic for the previous frame of input data multiplied by the decay coefficient.

The convergence statistic component can provide an output that identifies whether the adaptive filter is currently converged or diverged based, at least in part, upon the convergence statistic. When the convergence statistic is greater than a first threshold (e.g., the total number of center clipped bins is high), the AEC algorithm can be identified as currently converged. For example, the convergence statistic component can provide a flag (semaphore) identifying whether the adaptive filter is currently converged or diverged. Additionally, the convergence statistic component can maintain a diverged frame counter associated with the number of input frame(s) that the overall convergence statistic is less than a first threshold. When the AEC algorithm is currently converged, the diverged frame counter can be set to zero; otherwise, the diverged frame counter can be incremented.

If the diverged frame counter is less than or equal to a second threshold, the current convergence indication (e.g., flag) can be used to indicate that the AEC algorithm is currently converged. For this condition, the convergence history state is next updated. If the algorithm has not previously diverged, the history state can be set to continuously converged. If the history state has previously diverged, no action is taken.

However, if the diverged frame counter is greater than the second threshold, the current convergence indication (e.g., flag) can be used to indicate that the AEC algorithm is currently diverged. If the diverged frame counter is greater than the second threshold but less than or equal to a third threshold, the history state can be updated as indicated previously—if the AEC algorithm has not previously diverged, the history state can be set to continuously converged. If the history state has previously diverged, no action is taken. However, if the diverged frame counter is greater than the third threshold, the history state can be set to previously diverged.

Optionally, the AEC convergence detector can include a double talk detector. The optional double talk detector can determine whether echo is detected in the input signal (e.g., from an audio input device) and any other input is below an acceptable threshold. In the event that generally only echo is detected, the AEC convergence detector can perform convergence detection as described previously. However, in the event that the input signal includes more than echo (e.g., a near-end person talking or a background radio, TV, etc. playing above acceptable threshold), the AEC convergence detection is not performed.

Another aspect of the present invention provides for an AEC convergence detector to be a component of an AEC convergence detection system. The system further comprises an audio output frequency domain transform, an audio input frequency domain transform, an adaptive filter and a differential component.

The audio output frequency domain transform receives audio output data (e.g., from an audio computer component and/or video conferencing system). The audio output frequency domain transform performs a frequency domain transform of the audio input data (e.g., Fast Fourier Transform, a Discrete Fourier Transform (DFT) Filter Bank, Modulated Complex Lapped Transform—MCLT, or other suitable frequency domain transform.) and provides an output of frequency domain audio output to the adaptive filter.

The audio input frequency domain transform receives audio input data (e.g., from an audio input device). The audio input frequency domain transform performs a frequency domain transform (e.g., Fast Fourier Transform, Discrete Fourier Transform Filter Bank or MCLT) of the audio input data and provides an output of frequency domain audio input to the differential component.

The adaptive filter receives the frequency domain audio output from the audio output frequency domain transform. The adaptive filter adaptively filters the frequency domain audio output to approximate the true echo received (e.g., by a microphone).

The adaptive filter employs an adaptive filter to model the impulse response of a room. The echo is either removed (cancelled) or reduced once the adaptive filter converges to the true room response. Without AEC, captured audio input can include an echo from any sound that is played from the speaker(s). The adaptive filter can be used by application(s), such as video conferencing system(s) and/or speech recognition engine(s) to reduce the echo due to acoustic feedback from a speaker to a microphone. Failed or lost convergence of the adaptive filter may result in the perception of echo or audible distortion by the end user. The adaptive filter adaptively filters the frequency domain audio output to approximate the true echo and provides approximated echo to the differential component for cancellation of the echo.

The differential component receives the approximated echo output from the adaptive filter and frequency domain audio input from the audio input frequency domain transform. The differential component provides an output based, for example, upon the difference between the adaptive filter output and the frequency domain audio input. Thus, the differential component cancels the true echo from the audio input by subtracting the approximate echo generated by the adaptive filter. The output of the differential component can be provided to application(s).

The AEC convergence detector receives the output of the differential component and provides an output that identifies whether the adaptive filter is converged or diverged as described previously.

Yet another aspect of the present invention provides for an AEC convergence detection system to optionally further include an audio output device, an audio input device and/or an application program interface (API). The audio output device provides an audio output (e.g., to user(s)) and can include, for example, an integrated computer speaker, a free standing speaker and/or a speaker phone. The audio input device receives an audio input (e.g., from user(s)) and can include, for example, a telephone, a speaker phone and/or a microphone.

The API can provide access to the output identifying whether the adaptive filter is currently converged or diverged (e.g., to a user's application). In addition, optionally, the API can provide status on the convergence history. The API can thus allow application(s) to monitor the quality of the output of the adaptive filter and provide this information to the end user in order to improve the quality of the audio experience (e.g., without the need for a headset). Accordingly, the application(s) can alert the end user of the problem and offer suggestion(s) to minimize the problem (e.g., using new hardware).

Other aspects of the present invention provide methods for acoustic echo cancellation convergence detection, a computer readable medium having computer executable components for a system facilitating acoustic echo cancellation convergence detection, and a data packet adapted to be transmitted between two or more computer processes comprising a data field including a flag identifying whether an adaptive filter is currently converged, convergence being based, at least in part, upon a convergence statistic. In addition, the data packet can further comprise a second data field indicating a convergence history state.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
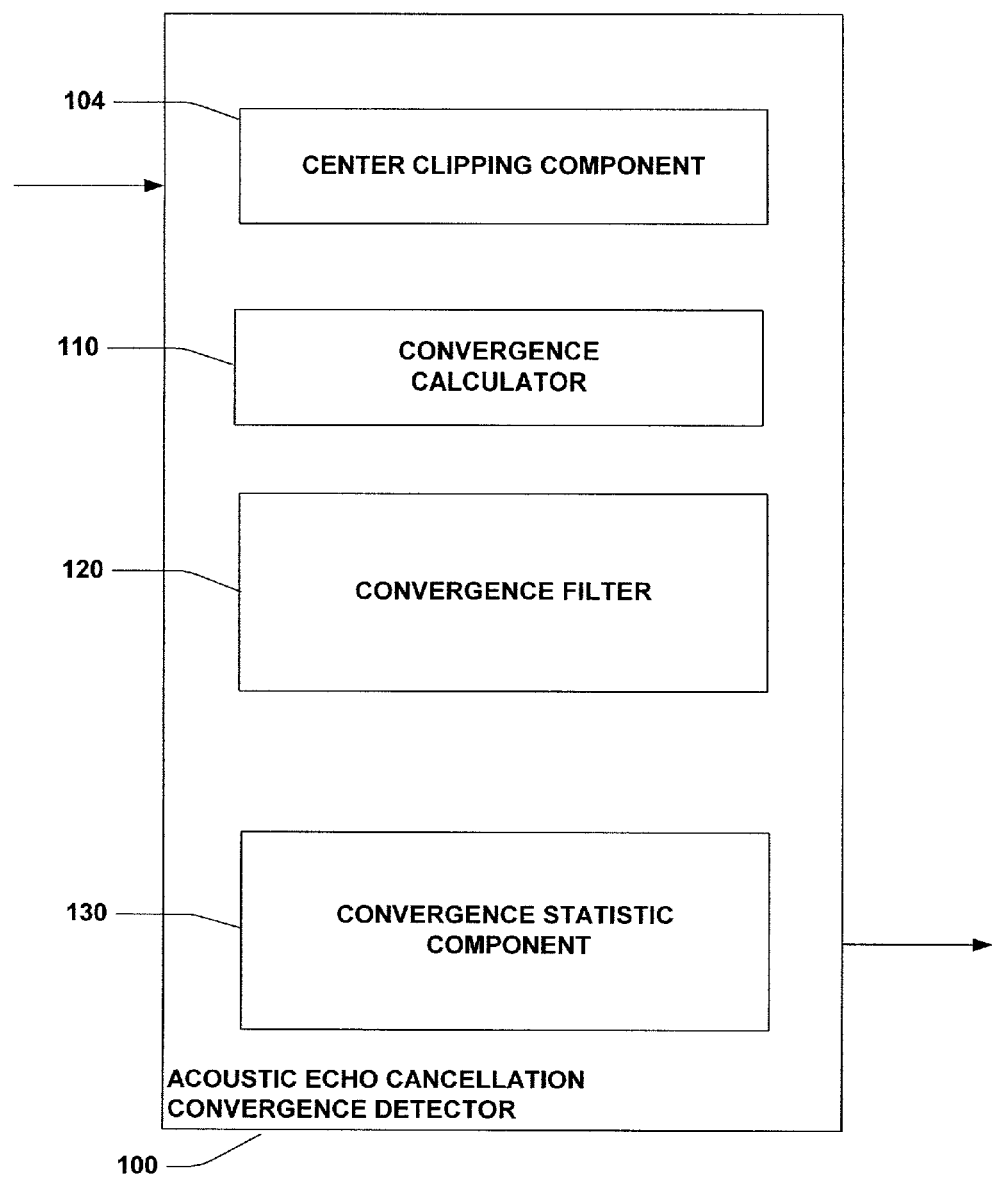
FIG. 1 is a block diagram of an acoustic echo cancellation convergence detector in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Figure 2:
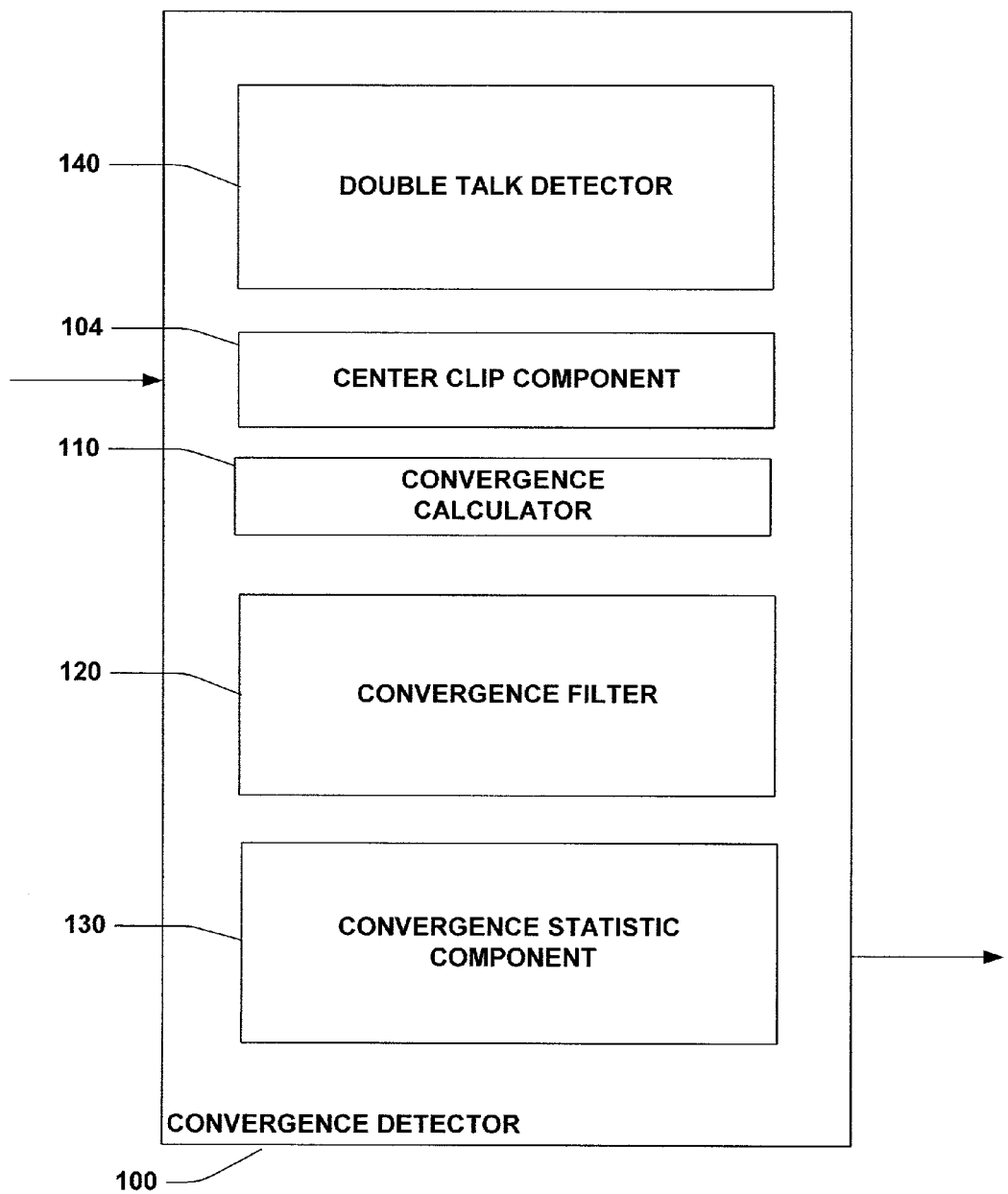
FIG. 2 is a block diagram of an acoustic echo cancellation convergence detector in accordance with an aspect of the present invention.

Referring to FIG. 1, an acoustic echo cancellation (AEC) convergence detector 100 in accordance with an aspect of the present invention is illustrated. The AEC convergence detector 100 includes a center clipping component 104, a convergence calculator 110, a convergence filter 120 and a convergence statistic component 130. As illustrated in FIG. 2, the AEC convergence detector 100 can, optionally, include a double talk detector 140.

The AEC convergence detector 100 can alert application(s) (not shown) when the AEC algorithm has failed to converge and/or lost convergence after previously having converged. Without AEC, captured audio input can include an echo from any sound that is played from the speaker(s). The AEC algorithm can be used by application(s), such as video conferencing system(s) and/or speech recognition engine(s) to reduce the echo due to acoustic feedback from a speaker (not shown) to a microphone (not shown). For example, the AEC algorithm can use an adaptive filter to model the impulse response of the room. The echo is either removed (cancelled) or reduced once the adaptive filter converges by subtracting the output of the adaptive filter from the audio input signal (e.g., by a differential component (not shown)). Failed or lost convergence of the adaptive filter may result in the perception of echo or audible distortion by the end user. The AEC convergence detector 100 allows application(s) to monitor the quality of the output of the AEC algorithm and provide this information (e.g., to an end user) in order to improve the quality of the audio experience (e.g., without the need for a headset). Accordingly, the application(s) can alert the end user of the problem and offer suggestion(s) to minimize the problem (e.g., using new hardware).

Due to external condition(s), on occasion the AEC algorithm either cannot converge initially or loses convergence after it has previously converged. Examples of problems that prevent or lead to lost convergence include a problem with the hardware, driver and/or a temporary change in the acoustic path caused by something in the near environment moving. This loss of convergence can lead to perceived echo or noticeable audio distortion to the end user. In order to provide a higher quality listening experience, it is desirable for application(s) that utilize AEC to be able to alert the end user that a quality problem has been detected and/or offer help to fix the problem.

The center clipping component 104 can monitor the output of a differential component (not shown) in the frequency domain and compare the results to a background noise level for each frequency band of interest. If the frequency bin of the current signal is less than the corresponding frequency bin of the noise, the frequency bin is center clipped and either set to zero or to some random noise value. If the AEC algorithm is working correctly, the number of frequency bins that are center clipped is high. The total number of center clipped, frequency bins is then used to detect and monitor the AEC algorithm's convergence. The center clipping component 104 provides an output as to whether the frequency bin(s) are center clipped. In one example, the input to the center clipping component 104 is based upon a difference of a frequency domain transform of the output of the audio input device and an output of the adaptive filter (e.g., received from a differential component (not shown)).

The convergence calculator 110 calculates a convergence parameter for a current frame of input data. The current frame of input data can be based on an output of a differential component (not shown) (e.g., subtracting an output of an adaptive filter (not shown) from an output of an audio input device (not shown)). The convergence parameter can be calculated, for example, by summing the number of center clipped frequency bins provided by the center clipping component 104 and dividing the result by the total number of frequency bins. The convergence filter 120 filters the convergence parameter and outputs a filtered convergence parameter. For example, the filtered convergence parameter can be calculated by averaging the convergence parameters over the past N frame(s) of captured input data, N being an integer greater than or equal to one. The filtering is used to smooth the convergence parameter for each input frame. In one example, a boxcar filter is utilized (e.g., to reduce complexity). However, it is to be appreciated that any suitable low pass filter can be employed by the convergence filter 120 in accordance with the present invention.

The convergence statistic component 130 calculates a convergence statistic. The convergence statistic can be based upon the filtered convergence parameter and/or the convergence statistic for a previous frame of input data multiplied by a decay coefficient (e.g., in the range of 0 to 1.0, inclusive). The decayed coefficient can be used to reduce detection of divergence for a small number of frame(s). The decay coefficient can be selected, for example, to prevent the AEC convergence detector 100 from immediately identifying instantaneous divergence. In one example, the convergence statistic can be the greater of the filtered convergence parameter and the convergence statistic for a previous frame of input data multiplied by the decay coefficient. When the convergence statistic is greater than a first threshold (e.g., the total number of center clipped bins is high), the AEC algorithm is currently converged.

The convergence statistic component 130 can provide an output that identifies whether the adaptive filter (not shown) is currently converged or diverged based, at least in part, upon the convergence statistic. In one example, the convergence statistic component 130 provides a flag (semaphore) identifying whether the adaptive filter is currently converged or diverged. In another example, the convergence statistic component 130 provides a state indicating the convergence history (e.g., continuously converged or previously diverged). The convergence statistic component 130 can maintain a diverged frame counter associated with the number of input frame(s) that the overall convergence statistic is less than the first threshold. For example, when the adaptive filter is currently converged, the diverged frame counter can be set to zero. Otherwise, the diverged frame counter can be incremented.

If the diverged frame counter is less than or equal to a second threshold, the current convergence indication (e.g., flag) can be used to indicate that the adaptive filter is currently converged. For this condition, the convergence history state is next updated. If the algorithm has not previously diverged, the history state is set to continuously converged. If the history state has previously diverged, no action is taken.

However, if the diverged frame counter is greater than the second threshold, the current convergence indication (e.g., flag) can be used to indicate that the adaptive filter is currently diverged. If the diverged frame counter is greater than the second threshold but less than or equal to a third threshold, the history state can be updated as indicated previously. If the adaptive filter has not previously diverged, the history state is set to continuously converged. If the history state has previously diverged, no action is taken. However, if the diverged frame counter is greater than the third threshold, the history state is set to previously diverged.

The optional double talk detector 140 can determine whether echo is detected in the input signal (e.g., from an audio input device (not shown) and any other input (e.g., near end speech, radio and/or TV) is below an acceptable threshold. In the event that generally only echo is detected, the AEC convergence detector 100 can perform convergence detection as described previously. However, in the event that the input signal includes more than echo (e.g., a near-end person talking or a background radio, TV, etc. playing above acceptable threshold), the AEC convergence detection is not performed.

While FIGS. 1 and 2 are a block diagrams illustrating components for the AEC convergence detector 100, it is to be appreciated that the convergence detector 100, the center clipping component 104, the convergence calculator 110, the convergence filter 120, the convergence statistic 130 and/or the double talk detector 140 can be implemented as one or more computer components, as that term is defined herein. Thus, it is to be appreciated that computer executable components operable to implement the AEC convergence detector 100, the center clipping component 104, the convergence calculator 110, the convergence filter 120, the convergence statistic component 130 and/or the double talk detector 140 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 3:
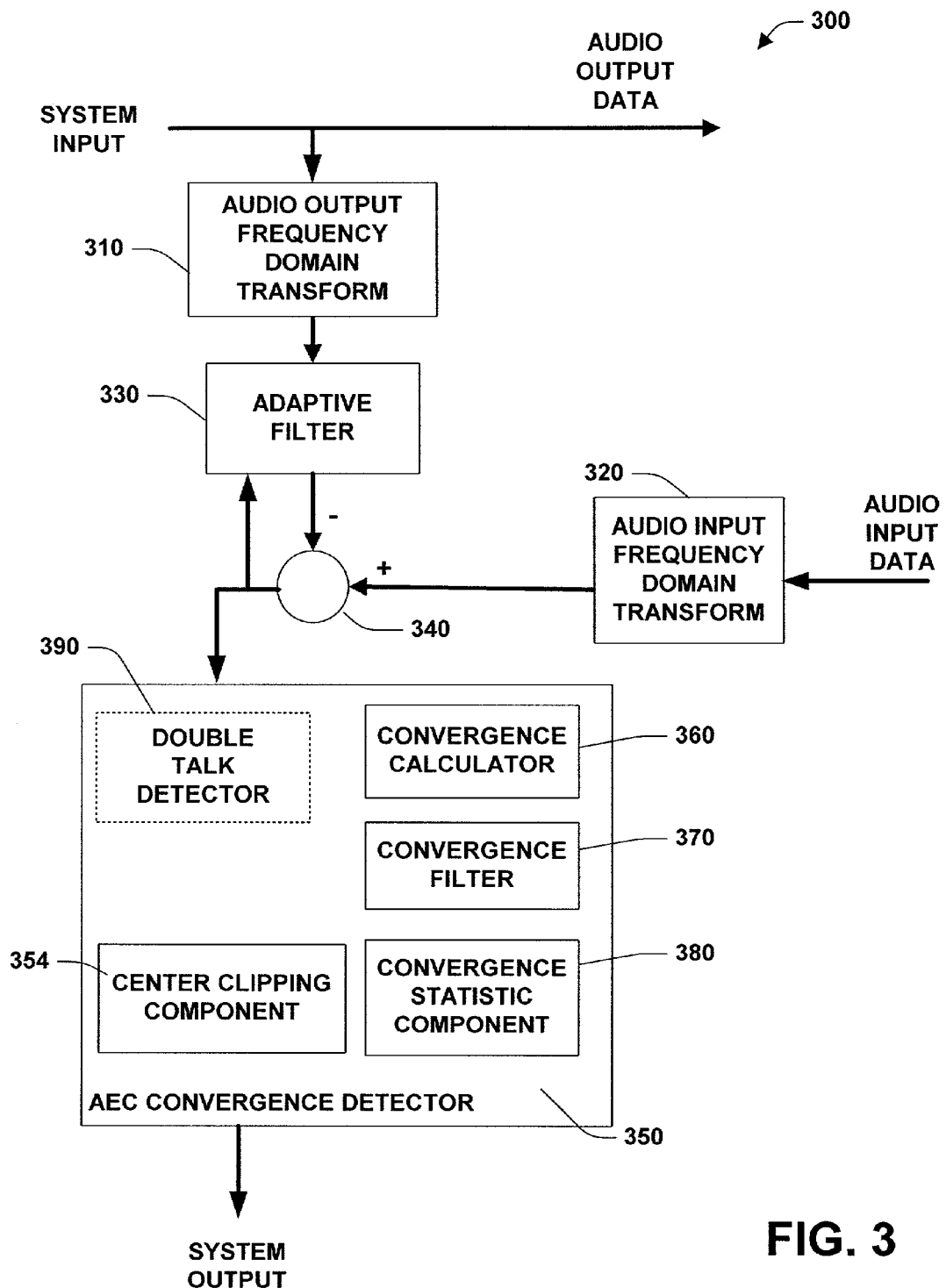
FIG. 3 is a block diagram of an acoustic echo cancellation convergence detection system in accordance with an aspect of the present invention.

Turning next to FIG. 3, an AEC convergence detection system 300 in accordance with an aspect of the present invention is illustrated. The AEC convergence detection system 300 includes an audio output frequency domain transform 310, an audio input frequency domain transform 320, an adaptive filter 330, a differential component 340 and an AEC convergence detector 350.

The audio output frequency domain transform 310 receives audio output data (e.g., from an audio computer component and/or video conferencing system). The audio output frequency domain transform 310 performs a frequency domain transform of the audio input data and provides an output of frequency domain audio output to the adaptive filter 330. In one example, the audio output frequency domain transform 310 employs a Fast Fourier transform to transform the audio output data. In another example, the audio output frequency domain transform 310 employs a Modulated Complex Lapped Transform (MCLT). In yet another example, the audio frequency domain transform 310 employs a Discrete Fourier Transform Filter Bank. However, it is to be appreciated that any suitable frequency domain transform can be employed by the audio output frequency domain transform 310 in accordance with the present invention.

The audio input frequency domain transform 320 receives audio input data (e.g., from an audio input device). The audio input frequency domain transform 320 performs a frequency domain transform of the audio input data and provides an output of frequency domain audio input to the differential component 340. In one example, the audio input frequency domain transform 320 employs a Fast Fourier transform to transform the audio input data. In another example, the audio input frequency domain transform 320 employs an MCLT. In yet another example, the audio input frequency domain transform 320 employ a Discrete Fourier Transform Filter Bank. However, it is to be appreciated that any suitable frequency domain transform can be employed by the audio input frequency domain transform 320 in accordance with the present invention.

The adaptive filter 330 receives the frequency domain audio output from the audio output frequency domain transform 310. The adaptive filter 330 adaptively filters the frequency domain audio output to approximate the true echo and provides approximated echo to the differential component 340 for cancellation of the echo.

The adaptive filter 330 can employ an adaptive filter to model the impulse response of a room. The echo is either removed (cancelled) or reduced (AEC) once the adaptive filter converges. Without AEC, captured audio input can include an echo from sound that is played from the speaker(s). The adaptive filter 330 can be used by application(s), such as video conferencing system(s) and/or speech recognition engine(s) to reduce the echo due to acoustic feedback from a speaker (not shown) to a microphone (not shown). Failed or lost convergence of the adaptive filter may result in the perception of echo or audible distortion by the end user.

The differential component 340 receives the approximate echo output from the adaptive filter 330 and frequency domain audio input from the audio input frequency domain transform 320. The differential component 340 provides an output based, for example, upon the difference between the approximated echo output and the frequency domain audio input. Thus, the differential component 340 cancels the true echo from the audio input by subtracting the approximated echo generated by the adaptive filter 330. The output of the differential component 340 can be provided to application(s) and/or the AEC convergence detector 350.

The AEC convergence detector 350 receives the output from the differential component 340 and provides an output that identifies whether the adaptive filter is converged or diverged. The AEC convergence detector 350 can include a center clipping component 354, a convergence calculator 360, a convergence filter 370 and a convergence statistic component 380. Optionally, the AEC convergence detector 350 can include a double talk detector 390.

The center clipping component 354 can monitor the output of the differential component 340 in the frequency domain and compare the outputs to a background noise level for each frequency band of interest. If the frequency bin of the current signal is less than the corresponding frequency bin of the noise, the frequency bin is center clipped and either set to zero or to some random noise value. If the AEC algorithm is working correctly, the number of frequency bins that are center clipped is high. The total number of center clipped, frequency bins is then used to detect and monitor the AEC algorithm's convergence. The center clipping component 354 provides an output as to whether the frequency bin(s) are center clipped.

The convergence calculator 360 calculates a convergence parameter based, at least in part, upon the output of the center clipping component 354 for a current frame. The convergence filter 370 filters the convergence parameter and outputs a filtered convergence parameter. The convergence statistic component 380 calculates a convergence statistic based, at least in part, upon the filtered convergence parameter and/or a convergence statistic for a previous frame multiplied by a decay coefficient. The convergence statistic component 380 can further provide the output that identifies whether the adaptive filter 330 is currently converged or diverged based, at least in part, upon the convergence statistic. In one example, the convergence statistic can be the greater of the filtered convergence parameter and the decayed factor of the convergence statistic for a previous frame. Optionally, the AEC convergence detector 350 can provide an output regarding convergence history as discussed previously.

Figure 4:
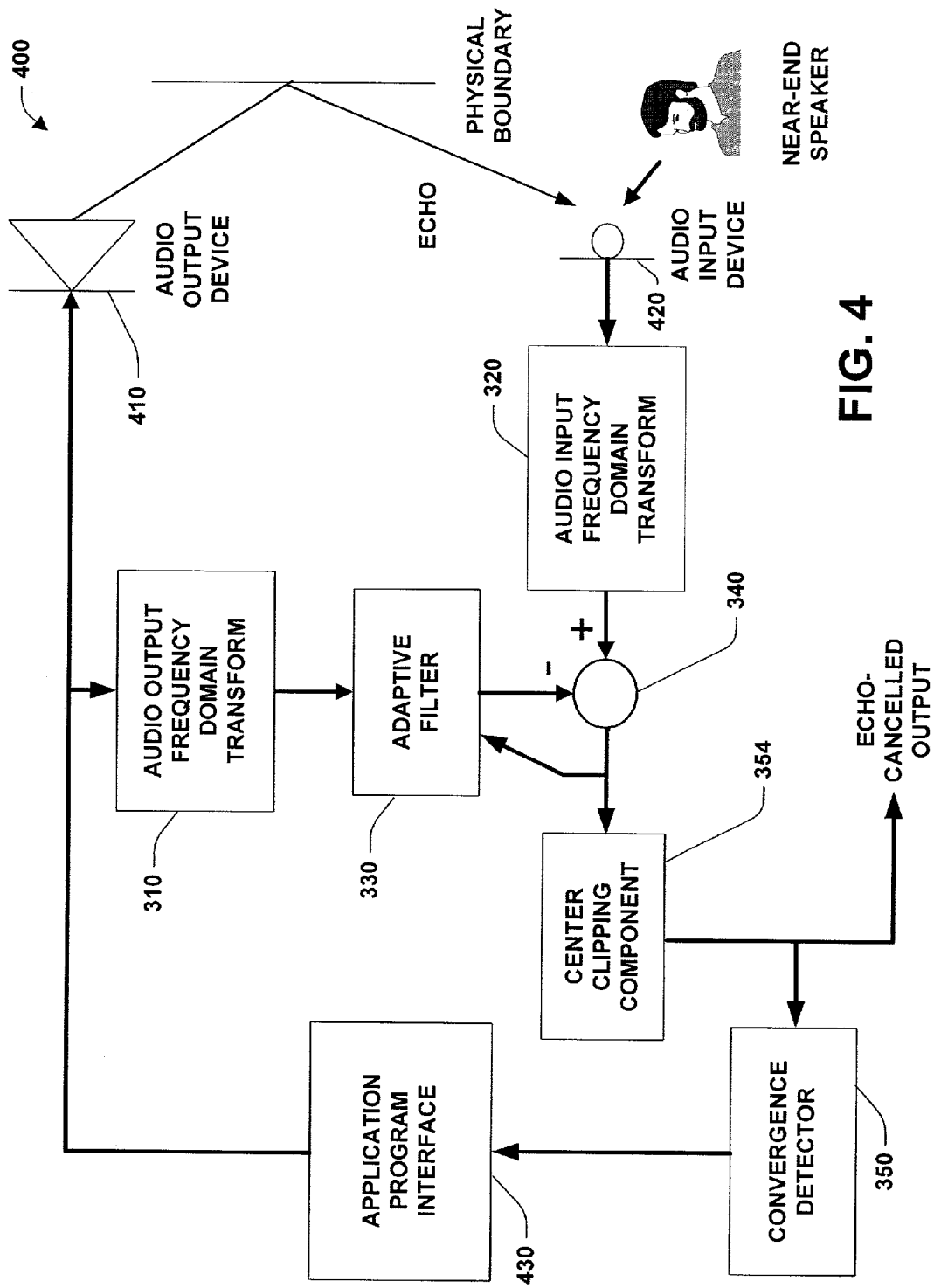
FIG. 4 is a block diagram of an acoustic echo cancellation convergence detection system in accordance with an aspect of the present invention.

Referring briefly to FIG. 4, the AEC convergence detection system 300 can, optionally, include an audio output device 410, an audio input device 420 and/or an application program interface (API) 430. As illustrated in FIG. 4, the center clipping component 354 can be a separate component and provide an echo-cancelled output for use by the convergence detector 350 and/or application(s) (e.g., low-level echo(es) that can still be in the signal before center clipping are substantially removed before sending the signal to application(s)).

The audio output device 410 provides an audio output (e.g., to user(s)) and can include, for example, an integrated computer speaker, a free standing speaker and/or a speaker phone. The audio input device 420 receives an audio input (e.g., from user(s)) and can include, for example, a telephone, a speaker phone and/or a microphone.

The API 430 can provide access to the output identifying whether the adaptive filter is converged or diverged (e.g., to a user's application). Optionally, the API 430 can also provide access to an output associated with history state (e.g., continuously converged or previously diverged). The API 430 can thus allow application(s) (not shown) to monitor the quality of the output of the adaptive filter 330 and provide this information to the end user in order to improve the quality of the audio experience (e.g., without the need for a headset). Accordingly, the application(s) can alert the end user of the problem and offer suggestion(s) to minimize the problem (e.g., using new hardware). A center clipping component 354 provides additional reduction of echo by clipping frequency bands whose levels are low enough (as described above), and thus the output of the center clipping component can be used by the application(s) as the echo-cancelled signal.

Figure 5:
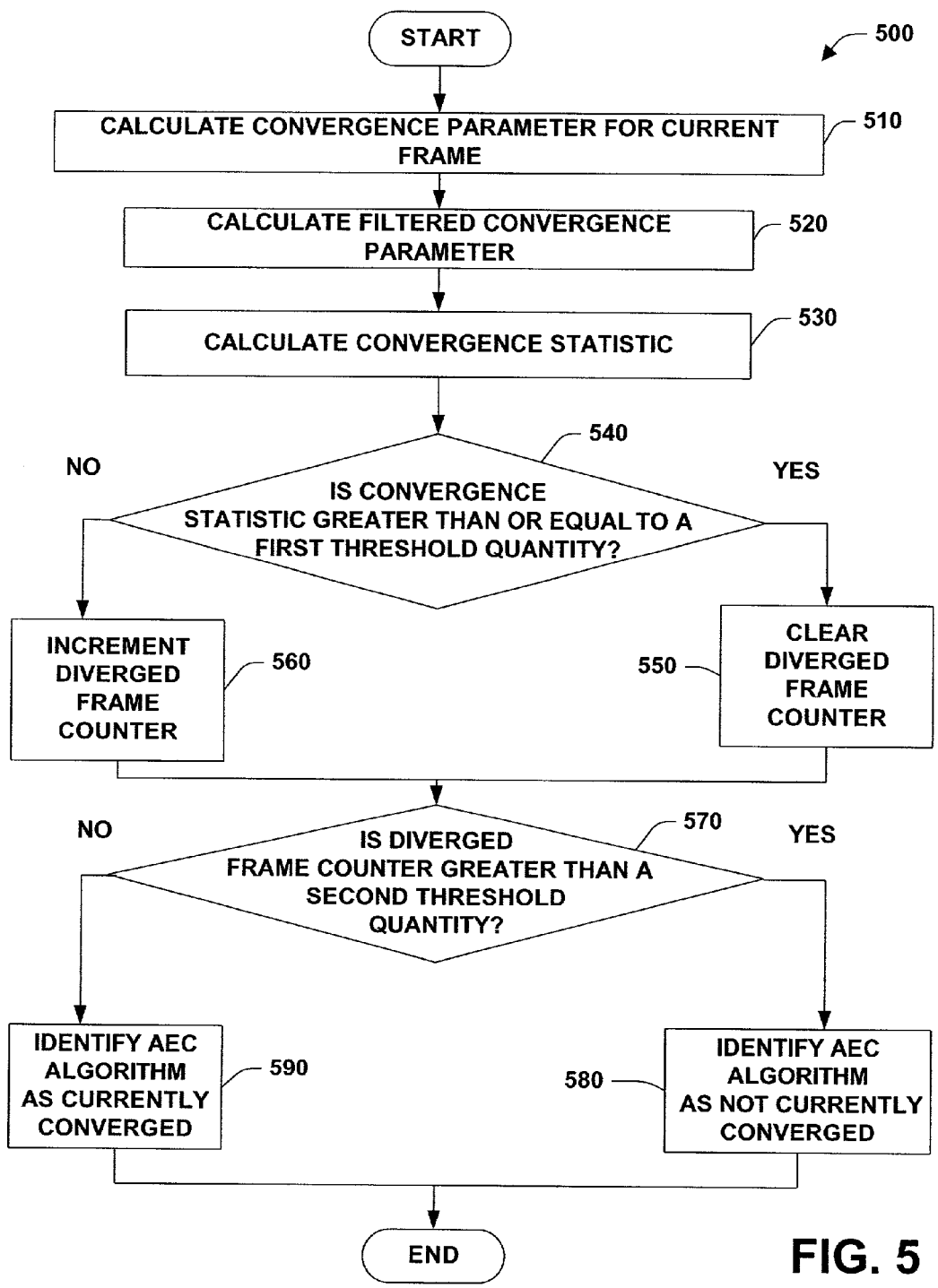
FIG. 5 is a flow chart illustrating a method for acoustic echo cancellation convergence detection in accordance with an aspect of the present invention.
Figure 6:
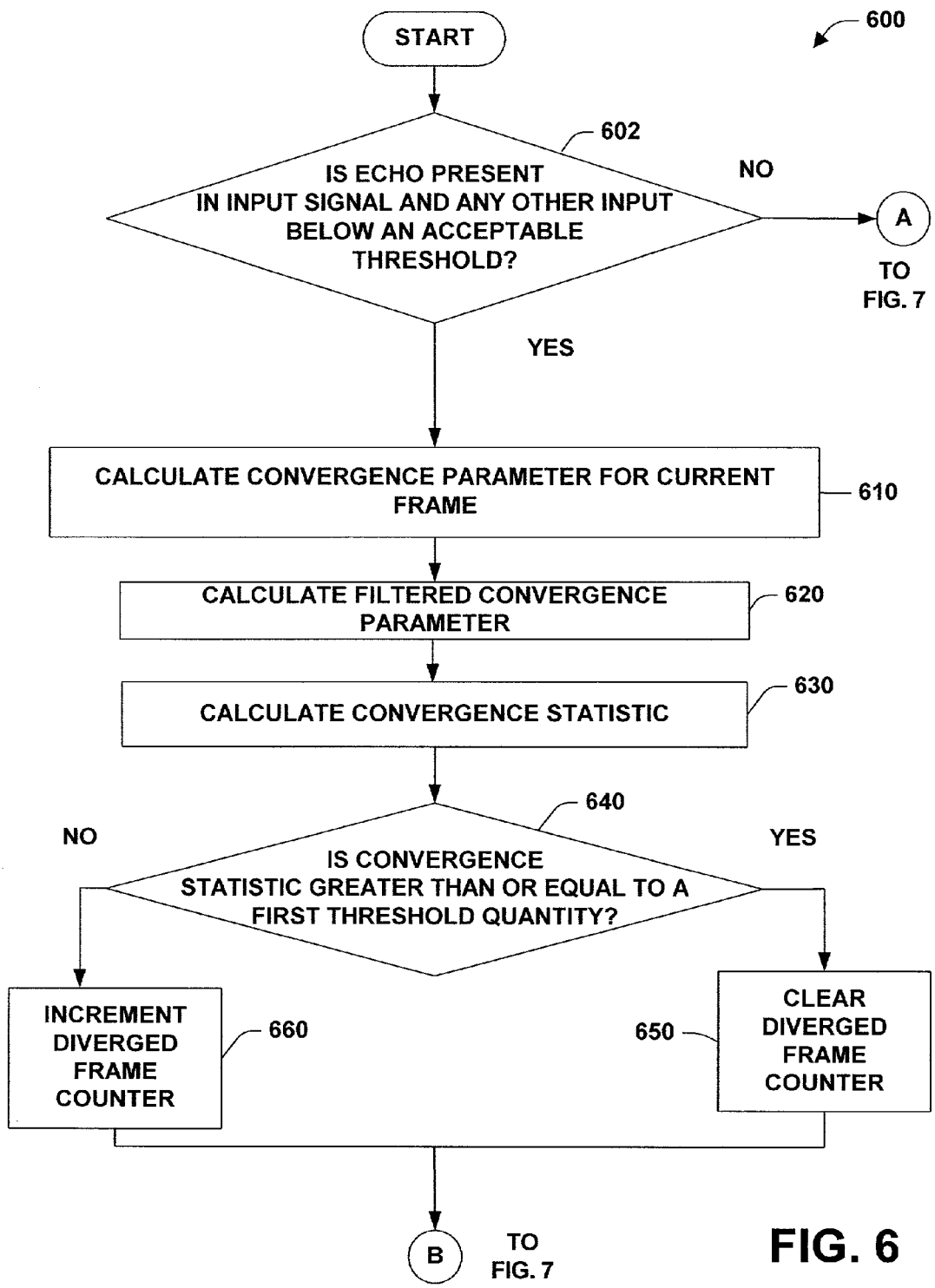
FIG. 6 is a flow chart illustrating a method for acoustic echo cancellation convergence detection in accordance with an aspect of the present invention.
Figure 7:
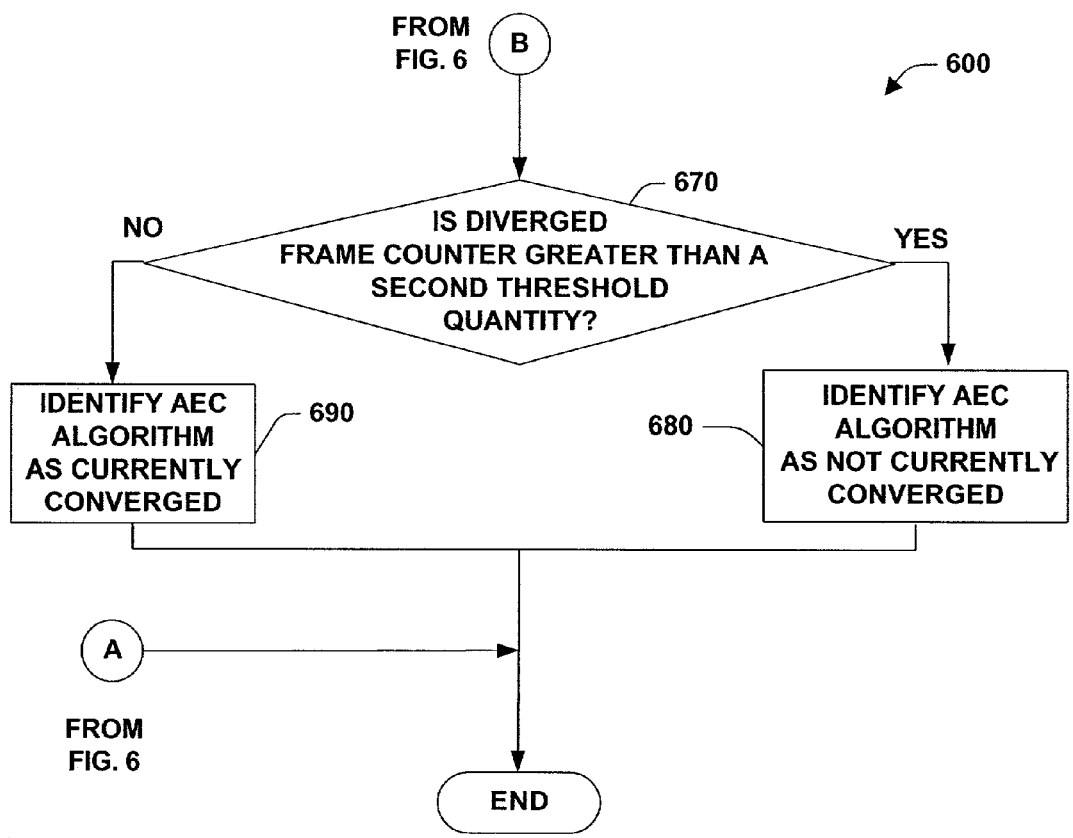
FIG. 7 is a flow chart further illustrating the method of FIG. 6 in accordance with an aspect of the present invention.

In view of the exemplary systems shown and described above, methodologies that may be implemented in accordance with the present invention will be better appreciated with reference to the flow charts of FIGS. 5, 6 and 7. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Turning to FIG. 5, a method 500 for acoustic echo cancellation convergence detection in accordance with an aspect of the present invention is illustrated. At 510, a convergence parameter for a current frame of input data (e.g., from a differential component 340) is calculated. For example, the current frame of input data can be based on the difference of an output of an adaptive filter and a frequency domain transform of an output of an audio input device (e.g., received from a differential component 340). The convergence parameter can be calculated, for example, by summing the number of center clipped frequency bins and dividing the result by the total number of frequency bins.

At 520, a filtered convergence parameter is calculated. For example, the filtered convergence parameter can be calculated by averaging the convergence parameters over the past M frame(s) of captured input data, M being an integer greater than or equal to one. The filtering is used to smooth the convergence parameter for each input frame. In one example, a boxcar filter is utilized (e.g., to reduce complexity). However, it is to be appreciated that any suitable low pass filter can be employed in calculating the filtered convergence parameter in accordance with the present invention.

At 530, a convergence statistic is calculated. The convergence statistic can be based upon the filtered convergence parameter and/or the convergence statistic for a previous frame of input data multiplied by a decay coefficient (e.g., in the range of 0 to 1.0, inclusive). The decayed coefficient can be used to reduce detection of divergence for a small number of frame(s). The decay coefficient can be selected, for example, to prevent the AEC convergence detector from immediately identifying instantaneous divergence. In one example, the convergence statistic can be the greater of the filtered convergence parameter and the convergence statistic for a previous frame of input data multiplied by the decay coefficient.

At 540, a determination is made as to whether the convergence statistic is greater than or equal to a first threshold quantity. If the determination at 540 is YES, at 550 a diverged frame counter is cleared and processing continues at 570. If the determination at 540 is NO, at 560, the diverged frame counter is incremented.

At 570, a determination is made as to whether the diverged frame counter is greater than a second threshold quantity. If the determination at 570 is YES, at 580 the AEC algorithm is identified as not currently converged and no further processing occurs. If the determination at 570 is NO, at 590, the AEC algorithm is identified as currently converged.

Referring to FIG. 6 and FIG. 7, a method 600 for acoustic echo cancellation convergence detection in accordance with an aspect of the present invention is illustrated. At 602, a determination is made as to whether echo is present in the input signal and any other input is below an acceptable threshold (e.g., only echo is present in the input signal). If the determination at 602 is NO, no further processing occurs. If the determination at 602 is YES, at 610, a convergence parameter for a current frame of input data (e.g., from a differential component 340) is calculated. At 620, a filtered convergence parameter is calculated. At 630, a convergence statistic is calculated.

At 640, a determination is made as to whether the convergence statistic is greater than or equal to a first threshold quantity. If the determination at 640 is YES, at 650 a diverged frame counter is cleared and processing continues at 670. If the determination at 640 is NO, at 660, the diverged frame counter is incremented.

At 670, a determination is made as to whether the diverged frame counter is greater than a second threshold quantity. If the determination at 670 is YES, at 680 the AEC algorithm is identified as not currently converged and no further processing occurs. If the determination at 670 is NO, at 690, the AEC algorithm is identified as currently converged.

Figure 8:
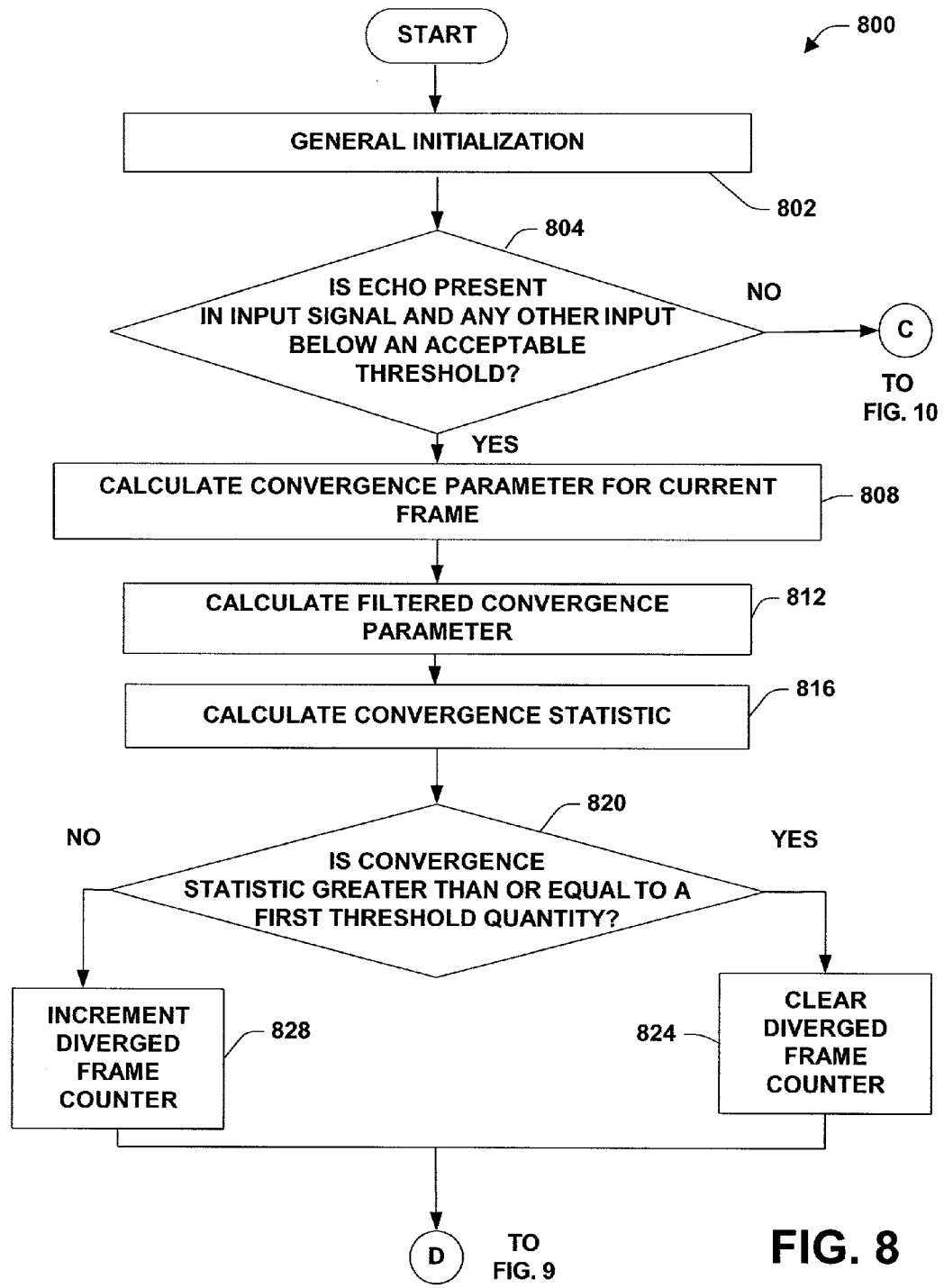
FIG. 8 is a flow chart illustrating a method for acoustic echo cancellation convergence detection in accordance with an aspect of the present invention.
Figure 9:
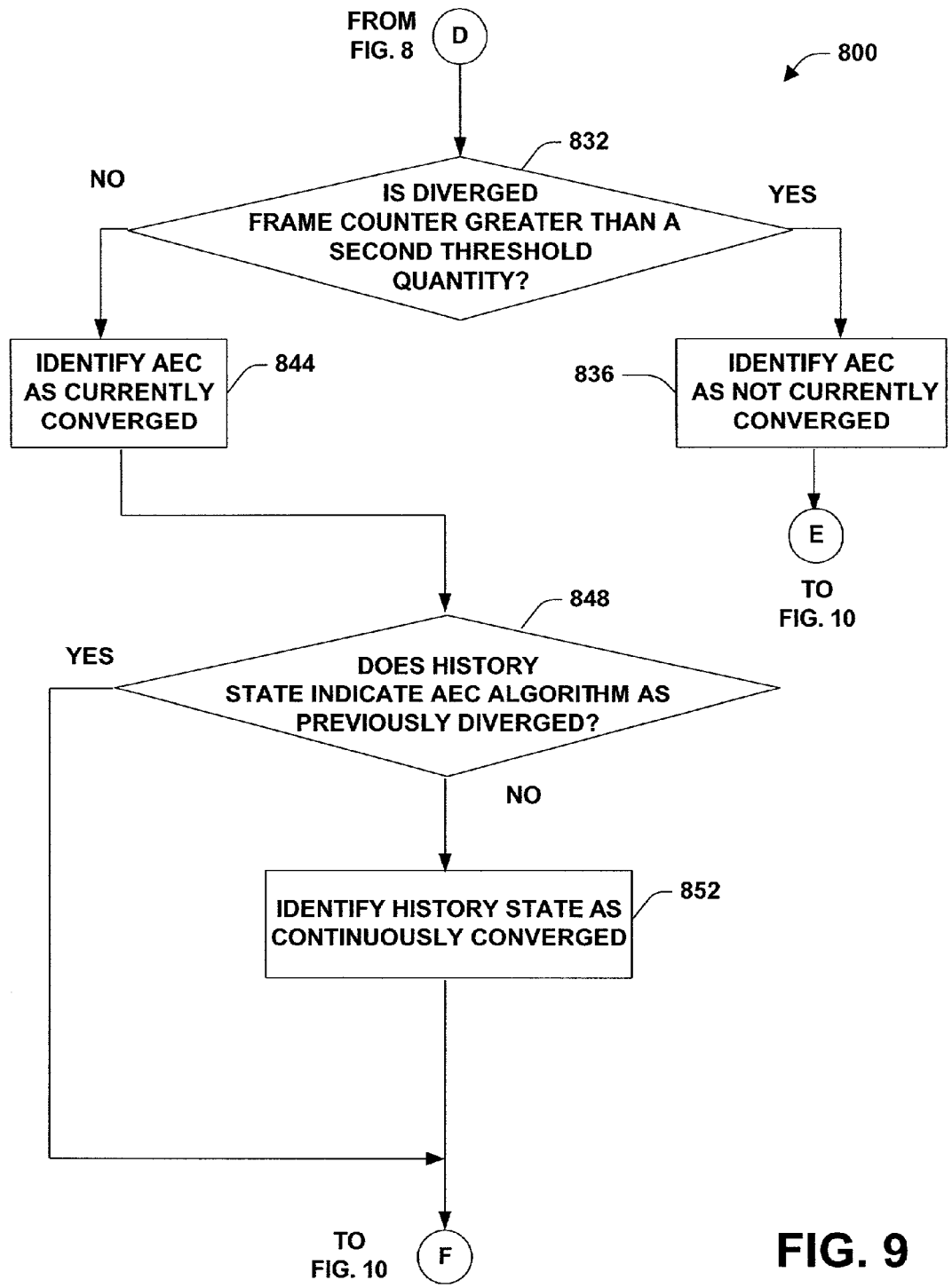
FIG. 9 is a flow chart further illustrating the method of FIG. 8 in accordance with an aspect of the present invention.
Figure 10:
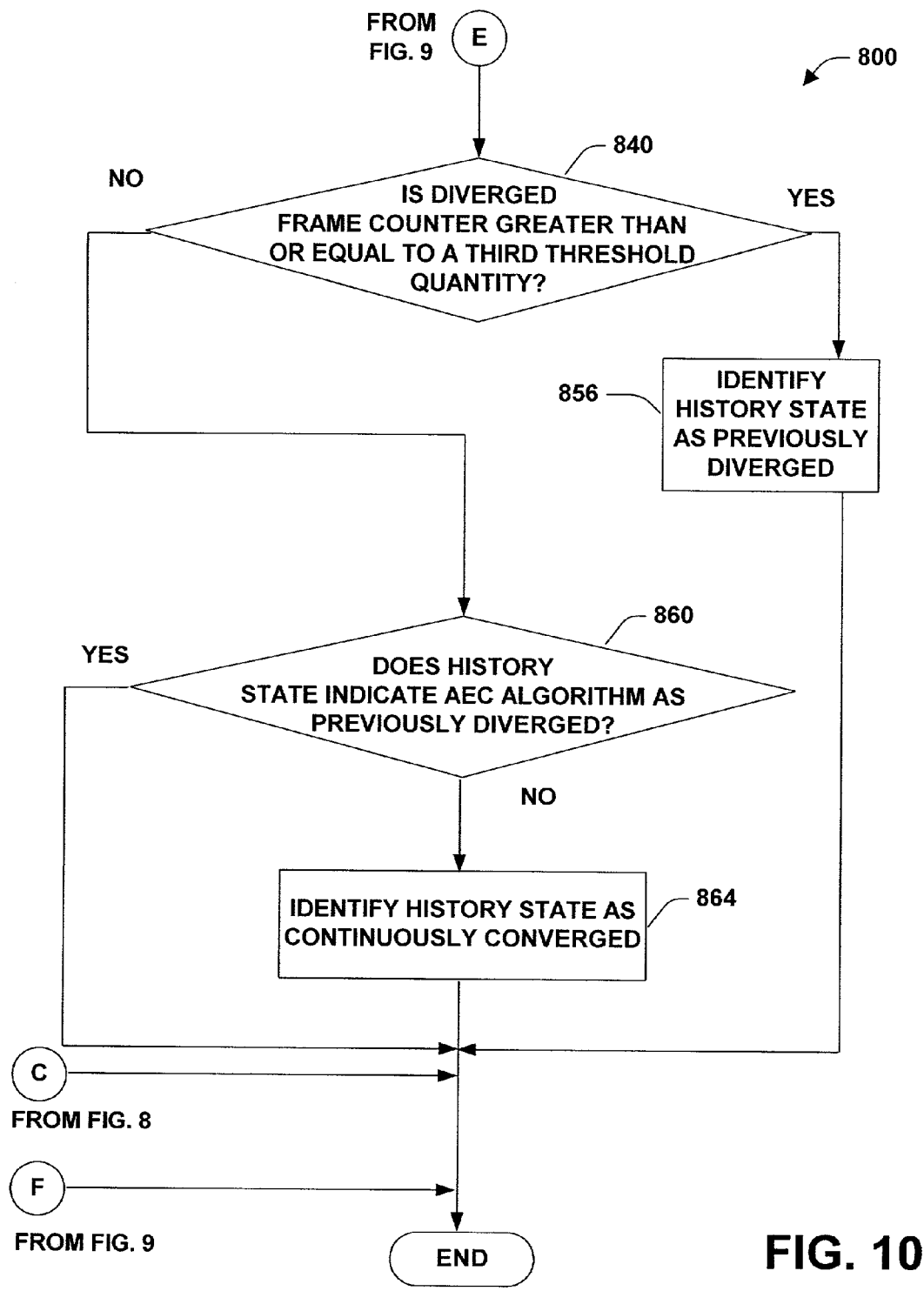
FIG. 10 is a flow chart further illustrating the method of FIG. 8 and FIG. 9 in accordance with an aspect of the present invention.

Next, referring to FIGS. 8, 9 and 10, a method 800 for acoustic echo cancellation convergence detection in accordance with an aspect of the present invention is illustrated. At 802, general initialization occurs. For example, a diverged frame counter, history state, convergence parameter, filtered convergence parameter and/or convergence statistic can be set to initial value(s). At 804, a determination is made as to whether echo is present in the input signal and any other input is below an acceptable threshold (e.g., only echo is present in the input signal). If the determination at 804 is NO, no further processing occurs. If the determination at 804 is YES, at 808, a convergence parameter for a current frame of input data (e.g., from a differential component 340) is calculated. At 812, a filtered convergence parameter is calculated. At 816, a convergence statistic is calculated.

At 820, a determination is made as to whether the convergence statistic is greater than or equal to a first threshold quantity. If the determination at 820 is YES, at 824 a diverged frame counter is cleared and processing continues at 832. If the determination at 820 is NO, at 828, a diverged frame counter is incremented.

At 832, a determination is made as to whether the diverged frame counter is greater than a second threshold quantity. If the determination at 832 is YES, at 836 the AEC algorithm is identified as not currently converged and processing continues at 840. If the determination at 832 is NO, at 844, the AEC algorithm is identified as currently converged. At 848, a determination is made as to whether a history state indicates the AEC algorithm as having previously diverged. If the determination at 848 is NO, at 852, the history state is identified as continuously converged and processing continues at 840. If the determination at 848 is YES, processing continues at 840.

At 840, a determination is made as to whether the diverged frame counter is greater than or equal to a third threshold quantity. If the determination at 840 is YES, at 856, the history state is identified as previously diverged and no further processing occurs. If the determination at 840 is NO, at 860, a determination is made as to whether the history state indicates the AEC algorithm as previously diverged. If the determination at 860 is YES, no further processing occurs. If the determination at 860 is NO, at 864, the history state is identified as continuously converged and no further processing occurs.

It is to be appreciated that the system and/or method of the present invention can be utilized in an overall acoustic echo cancellation system. Further, those skilled in the art will recognize that the system and/or method of the present invention can be employed in a vast array of acoustic applications, including, but not limited to, teleconferencing and/or speech recognition. It is also to be appreciated that the system and/or method of the present invention can be applied to handle a multi-channel output (a plurality of output devices, for example, speakers) and/or multi-channel input (based on a plurality of input devices, for example, microphones).

In one example, there is an adaptive filter and differential component associated with each output device/input device pair (e.g., speaker/microphone pair). The outputs of each of the adaptive filters and differential components can be combined, for example, by a microphone array to produce one channel. Center clipping and convergence detection can be performed on the final output.

In another example, center clipping and convergence detection can be performed for each channel separately with a separate status provided (API, data packet) for each individual input channel (e.g., microphone channel).

Figure 11:
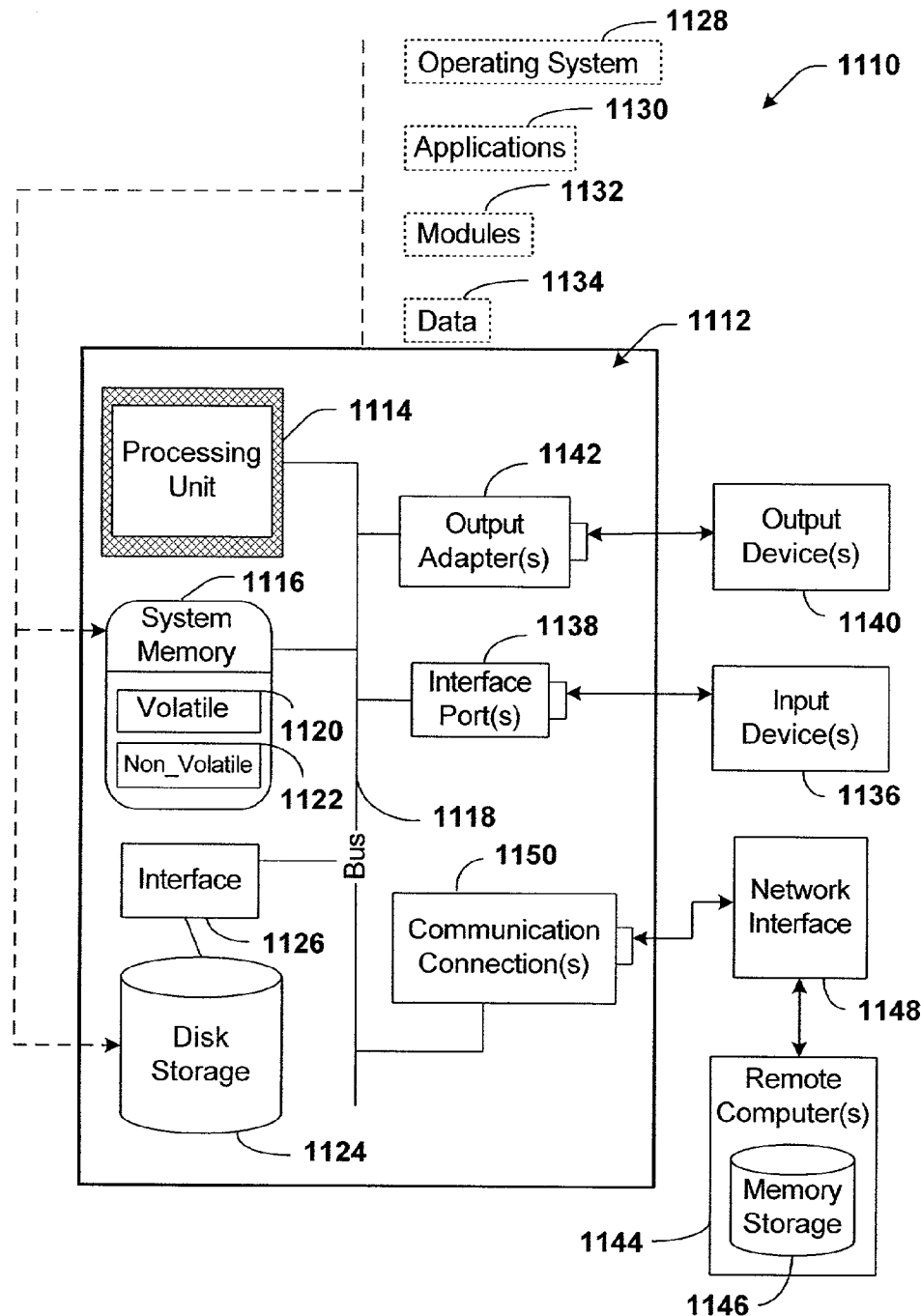
FIG. 11 illustrates an example operating environment in which the present invention may function.

In order to provide additional context for various aspects of the present invention, FIG. 11 and the following discussion are intended to provide a brief, general description of a suitable operating environment 1110 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1110 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/nonremovable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/ software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An acoustic echo cancellation convergence detector, comprising:
    a center clipping component that receives an output of a differential component based, at least in part, upon a difference of an output of an adaptive filter and an output of an audio input device, the center clipping component further comparing the output of the differential component to a background noise level and providing an output of whether a frequency bin is center clipped;
    a convergence calculator that calculates a convergence parameter for a current frame of input data, the input data being based, at least in part, upon the output of the differential component;
    a convergence filter that filters the convergence parameter and outputs a filtered convergence parameter;
    a convergence statistic component that calculates a convergence statistic based, at least in part, upon at least one of the filtered convergence parameter and the convergence statistic for a previous frame of input data multiplied by a decay coefficient, the convergence statistic component further providing an output that identifies whether the adaptive filter is converged or diverged based, at least in part, upon the convergence statistic; and
    the convergence statistic being based upon the greater of the filtered parameter and the convergence statistic for the previous frame of input data multiplied by the decay coefficient.

2. The acoustic echo cancellation convergence detector of claim 1, the output of the differential component being based, at least in part, upon a difference of a frequency domain transform of the output of the audio input device and an output of the adaptive filter.

3. The acoustic echo cancellation convergence detector of claim 1, the convergence filter utilizing previous values of the convergence parameter to filter the convergence parameter.

4. The acoustic echo cancellation convergence detector of claim 1, the convergence parameter being based, at least in part, upon the quantity of frequency bins that are center clipped.

5. The acoustic echo cancellation convergence detector of claim 4, the convergence parameter being based, at least in part, upon the quantity of frequency bins.

6. The acoustic echo cancellation convergence detector of claim 1, the convergence statistic component further providing a convergence history state output.

7. An acoustic echo cancellation convergence detection system, comprising:
    an audio output frequency domain transform that receives audio output data, performs a frequency domain transform of the audio output data and provides an output of frequency domain audio output;
    an audio input frequency domain transform that receives audio input data, performs a frequency domain transform of the audio input data and provides an output of frequency domain audio input;
    an adaptive filter that receives the frequency domain audio output, adaptively filters the frequency domain audio output to approximate echo, the adaptive filter providing an approximated echo output;
    a differential component that receives the approximated echo output and the frequency domain audio input, the differential component providing an acoustic echo cancel output based, at least in part, upon the difference between the approximated echo output and the frequency domain audio input;
    an acoustic echo cancellation convergence detector that receives the output of the differential component and provides a convergence output that identifies whether the adaptive filter is converged or diverged;
    a center clipping component that receives the output of the differential component, the center clipping component further comparing the output to a background noise level and providing an output of whether a frequency bin is center clipped;
    a convergence calculator that calculates a convergence parameter based, at least in part, upon the output of the differential component;
    a convergence filter that filters the convergence parameter and outputs a filtered convergence parameter; and,
    a convergence statistic component that calculates a convergence statistic based, at least in part, upon the greater of the filtered convergence parameter and a convergence statistic for a previous frame multiplied by a decay coefficient, the convergence statistic component further providing the output that identifies whether the adaptive filter is converged or diverged based, at least in part, upon the convergence statistic.

8. The acoustic echo cancellation convergence detection system of claim 7, at least one of the audio output frequency domain transform and the audio input frequency domain transform utilizing at least one of a Fast Fourier Transform, a Discrete Fourier Transform Filter Bank and a Modulated Complex Lapped Transform.

9. The acoustic echo cancellation convergence detection system of claim 7, the audio output device comprising at least one of an integrated computer speaker, a free standing speaker and a speaker phone.

10. The acoustic echo cancellation convergence detection system of claim 7, further comprising an audio input device that provides the audio input data.

11. The acoustic echo cancellation convergence detection system of claim 10, the audio input device comprising at least one of a telephone, a speaker phone and a microphone.

12. The acoustic echo cancellation convergence detection system of claim 7, the acoustic echo cancellation convergence detector further providing a convergence history state output.

13. A method for acoustic echo cancellation convergence detection, comprising:
    calculating a convergence parameter for a current frame of input data, the input data being based, at least in part, upon an output of a differential component;
    calculating a filtered convergence parameter based, at least in part, upon the convergence parameter;
    calculating a convergence statistic based at least in part upon at least one of the filtered convergence parameter and a convergence statistic for a previous frame of input data multiplied by a decay coefficient;
    determining whether the convergence statistic is greater than or equal to a first threshold quantity;
    providing an output identifying an acoustic echo cancellation algorithm as being currently converged, if the convergence statistic is greater than or equal to the first threshold quantity;
    calculating a decayed version of the previous convergence statistic; and,
    assigning the convergence statistic to be the greater of the previous convergence statistic multiplied by the decay coefficient and the filtered convergence statistic.

14. The method of claim 13, further comprising:
    incrementing a diverged frame counter, if the convergence statistic is not greater than or equal to the first threshold quantity;
    determining whether the diverged frame counter is greater than a second threshold quantity; and,
    providing an output identifying the acoustic echo cancellation algorithm as not currently converged, if the diverged frame counter is greater than the second threshold.

15. The method of claim 14, further comprising at least one of the following acts:
    determining whether the diverged frame counter is greater than or equal to a third threshold;
    providing an output identifying a history state as previously diverged;
    determining whether the history state identifies the AEC algorithm as having been previously diverged, if the diverged frame counter is not greater than the second threshold; and,
    providing an output identifying the history state as continuously converged, if the AEC algorithm is identified as being currently converged and the history state does not identify the AEC algorithm as having been previously diverged.

16. The method of claim 13, calculating a convergence parameter further comprising:
    for each frequency bin, determining whether the frequency bin is center clipped;
    incrementing a counter associated with a number of clipped bands, if the frequency bin is center clipped; and,
    calculating the convergence parameter by dividing the number of clipped bands counter by the number of frequency bins.

17. The method of claim 13, calculating a filtered convergence parameter further comprising:
    calculating an average of the convergence parameters for at least one previous frame of input data.

18. A computer readable medium storing computer executable components of a system facilitating acoustic echo cancellation convergence detection, comprising:
    a center clipping component that receives an output of a differential component, the center clipping component further comparing the output to a background noise level and providing an output of whether a frequency bin is center clipped, the output of the differential component being based, at least in part, upon a difference of an output of an adaptive filter and an output of an audio input device;
    a convergence calculator component that calculates a convergence parameter for a current frame of input data based, at least in part, upon the output of the differential component;
    a convergence filter component that filters the convergence parameter and outputs a filtered convergence parameter; and,
    a convergence statistic component that calculates a convergence statistic based at least in part upon at least one of the filtered convergence parameter and a convergence statistic for a previous frame of input data multiplied by a decay coefficient, the convergence statistic component further providing an output that identifies whether the adaptive filter is converged or diverged based, at least in part, upon the convergence statistic; and
    the convergence statistic being based upon the greater of the filtered parameter and the convergence statistic for the previous frame of input data multiplied by the decay coefficient.

19. An acoustic echo cancellation convergence detection system, comprising:
    means for comparing an output of a differential component to a background noise level and providing an output of whether a frequency bin is center clipped, the output of the differential component being based, at least in part, upon a difference of an output of an adaptive filter and an output of an audio input device;
    means for calculating a convergence parameter for a current frame of input data based, at least in part, upon the output of the differential component;
    means for filtering the convergence parameter and providing a filtered convergence parameter;
    means for calculating a convergence statistic component, the convergence statistic being based at least in part upon at least one of the filtered convergence parameter and a convergence statistic for a previous frame of input data multiplied by a decay coefficient;
    means for providing an output that identifies whether the adaptive filter is converged or diverged based, at least in part, upon the convergence statistic; and
    means for basing the convergence statistic upon the greater of the filtered parameter and the convergence statistic for the previous frame of input data multiplied by the decay coefficient.

* * * * *